Patented Aug. 15, 1933

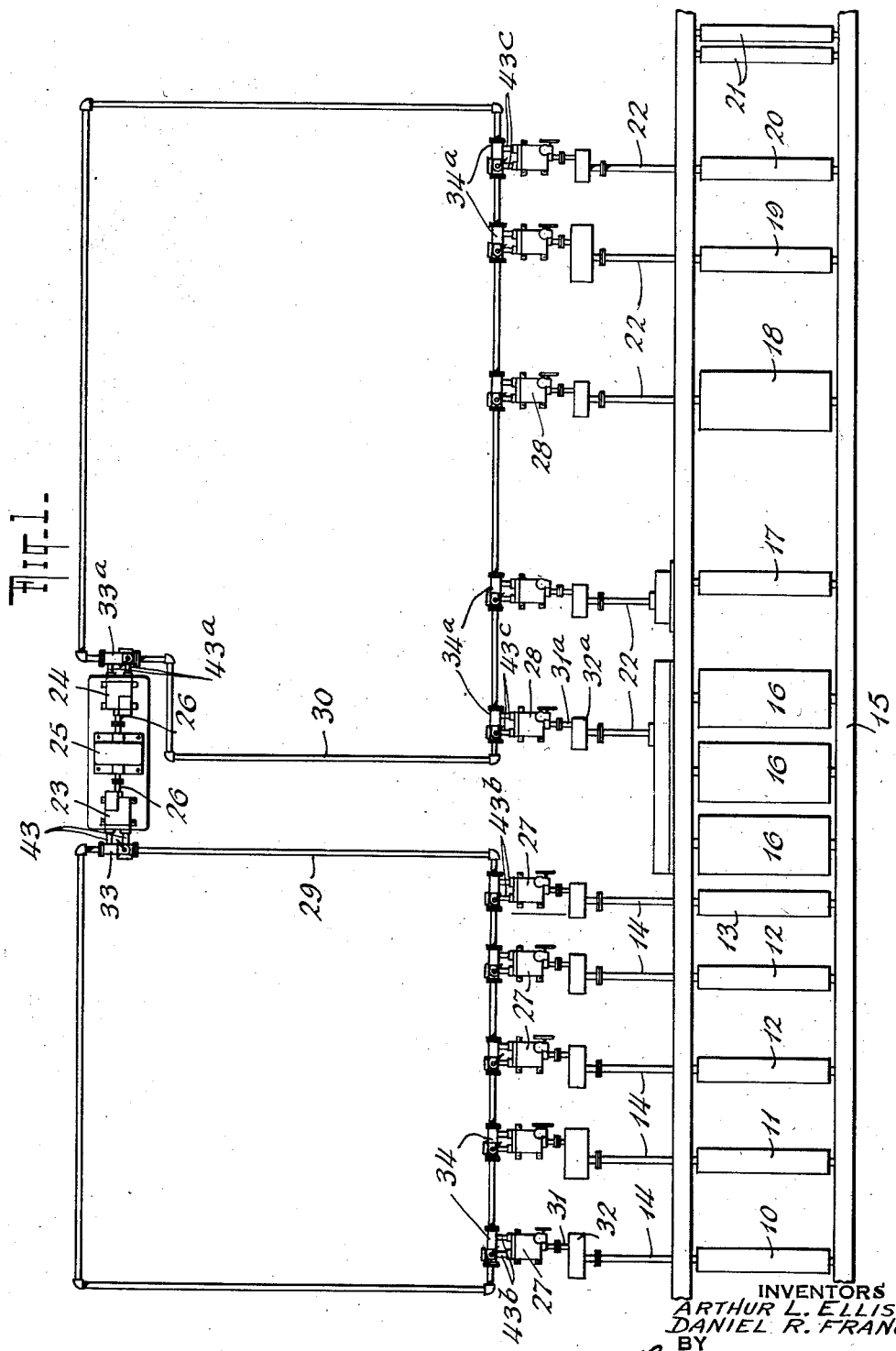

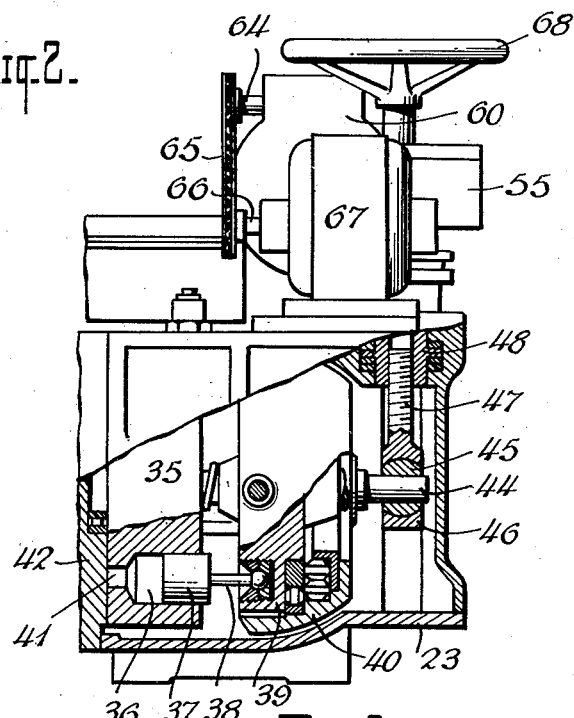
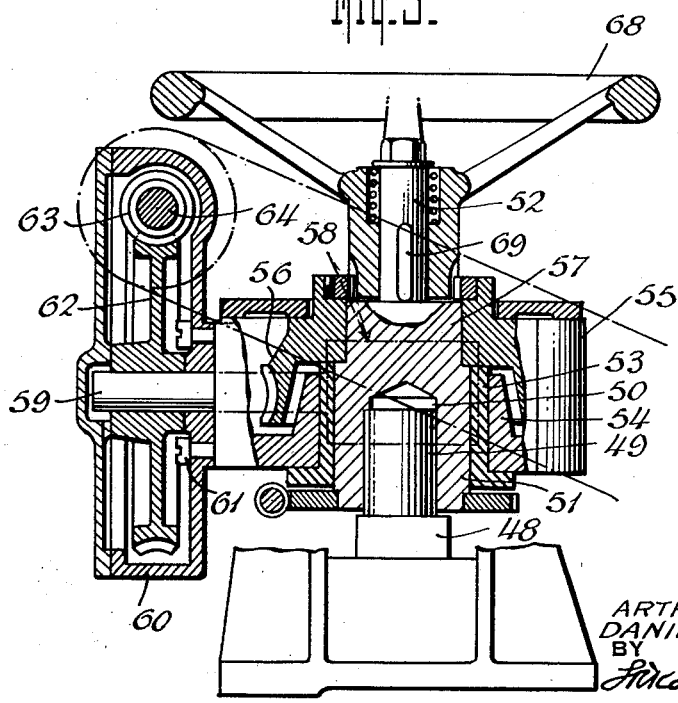

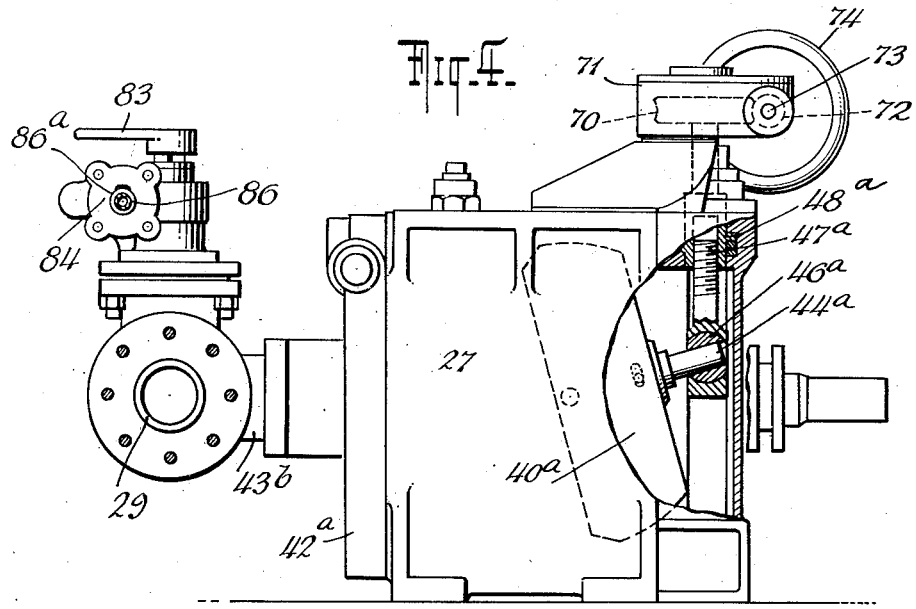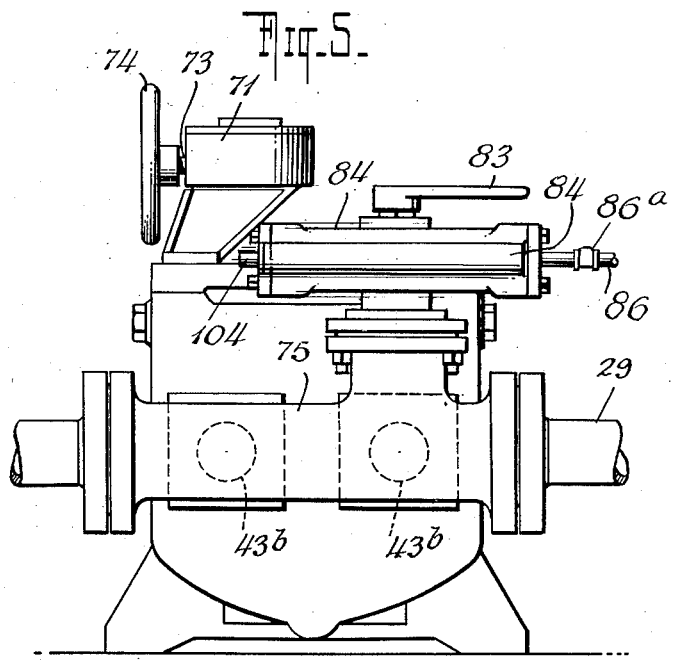

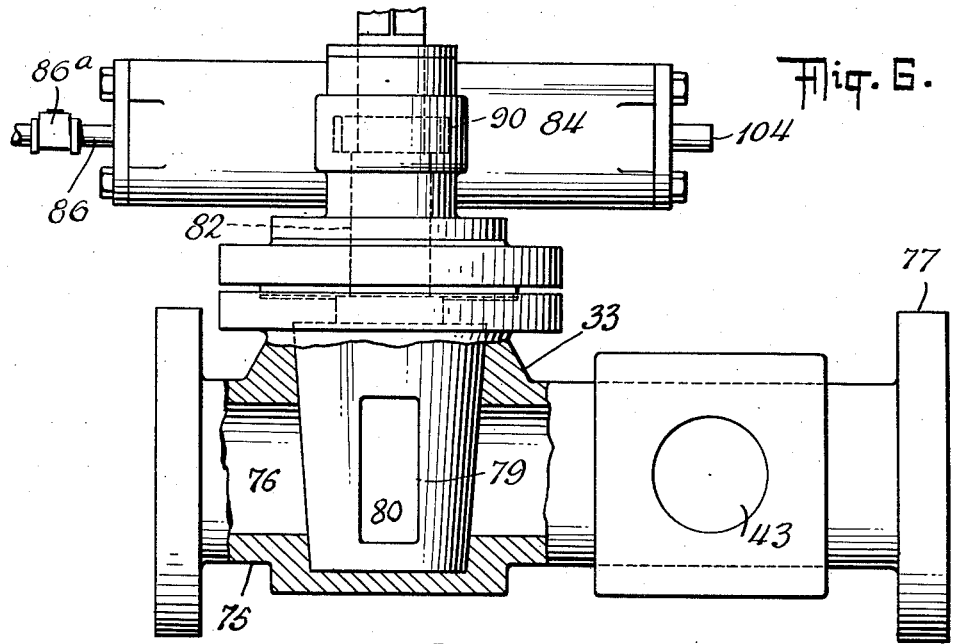
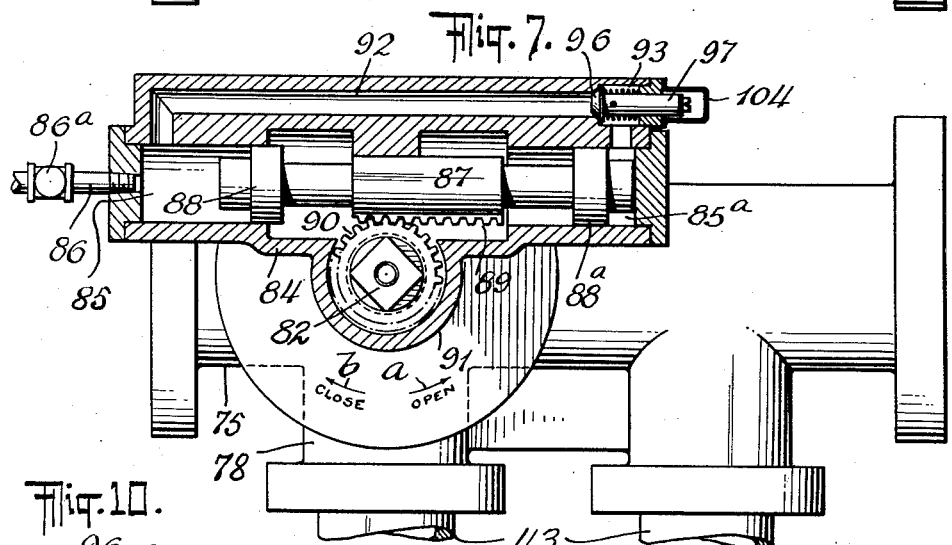
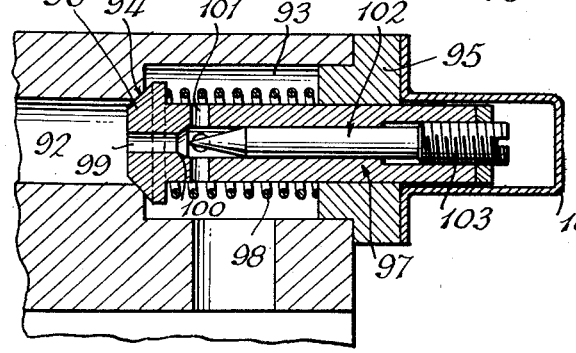

1,922,887

UNITED STATES PATENT OFFICE 1,922,887

VARIABLE SPEED GEAR TRANSMISSION

Arthur L. Ellis, New Rochelle, N. Y., and Daniel R. Francis, Waterbury, Conn., assignors to The Waterbury Tool Company, Waterbury, Conn., a Corporation of Connecticut Application December 10, 1931
Serial No. 580,000

4 Claims. (Cl. 60—53)

Our invention relates to variable speed gear transmissions and more particularly to hydraulic speed gear transmissions of the type which include a power driven fluid pressure pump and a fluid pressure motor to which fluid under pressure is delivered by said pump for producing an operative rotation of the motor shaft. The object of the invention is to provide a novel and simple transmission of the indicated class whereby machines comprising a plurality of sections may be efficiently operated to provide synchronized operation in all of the sections of the machine and at the same time to enable the operation of the individual sections of said machine or individual parts of such sections to be selectively controlled in a predetermined manner and in accordance with operative conditions as they may develop. Other more specific objects of the invention will appear from the description hereinafter and the features of novelty will be pointed out in the claims.

In the accompanying drawings which show an example of the invention without defining its limits, Fig. 1 is a diagrammatic view illustrating one arrangement of the novel variable speed gear transmission in connection with a typical paper machine; Fig. 2 is a fragmentary elevation, partly in section, of one of the units of the transmission; Fig. 3 is a fragmentary sectional view, on an enlarged scale, of the control means of said unit; Figs. 4 and 5 are elevations, looking at right angles to each other, illustrating another unit of said transmission; Fig. 6 is an elevation, partly in section, showing a by-pass valve included in the novel arrangement; Fig. 7 is a sectional plan view thereof; Figs. 8 and 9 are detail cross-sections of said by-pass valve on the line 9—9 of Fig. 6, and Fig. 10 is a fragmentary section, on an enlarged scale, showing details of a valve included in Figs. 6 and 7.

For the purpose of description the invention has been illustrated in a form specially adapted to operate a paper machine consisting of a plurality of sections, in a manner to positively and efficiently control the speed and travel of a web of paper in its passage through said machine. It is to be distinctly understood that the illustrated example is not intended to define the limits of the invention, which may be efficiently utilized in connection with any type of machine developing the problems which the novel arrangement is designed to successfully meet and overcome.

In the diagrammatic illustration of Fig. 1 the paper machine may be said to consist of two sections, one of which comprises the couch roll 10, the suction roll 11, the first and second press rolls 12 and the smoothing roll 13 all carried by shafts 14 suitably journalled upon a conventional frame 15; the other section of the machine shown in Fig. 1 consists of the first driers 16, the size press roll 17, the second driers 18, the calender roll 19, the reel 20 carried by shafts 22 also all rotatably mounted upon the frame 15 in any conventional manner; Fig. 1 also illustrates rolls 21 which constitute part of the winder and require an individual drive, not shown in the drawings.

The transmission in the illustrated example consists of two hydraulic pump units 23 and 24 of the well known Waterbury type and commonly referred to as A-ends, said units 23 and 24 being driven in any suitable manner as by means of an electric motor 25 which in such case may be coupled to the driving shafts 26 of both of said A-ends as shown in Fig. 1. The pump units or A-ends 23 and 24 supply pressure oil to groups of motor units 27 and 28 also of the Waterbury type and usually referred to as B ends, and accordingly are connected thereby by means of pipes 29 and 30. In the illustrated example each group of B-ends consists of five motor units 27 and 28 respectively, the units in each group being connected in series by the respective pipes 29 and 30 so that the oil pumped by the respective pump units 23 and 24 must pass through all of the motor units 27 and 28 of the respective groups as will appear more fully hereinafter. The driven shafts 31 of the motor units 27 of the one group are connected, preferably through the medium of conventional gear reduction units 32, with the shafts 14 of the rolls 10, 11, 12 and 13 which comprise the one section of the illustrated paper machine; similarly the driven shafts 31a of the motor units 28 of the other group are connected, preferably by means of corresponding gear reduction units 32a with the shafts 22 of the rolls 16, 17, 18 and 19, and the reel 20 which comprise the second section of said paper machine; as previously stated the winder rolls 21 are driven by an individual drive. Each group of the transmission further includes by-pass valves 33 and 34, and 33a and 34a located in the pipe connections 29 and 30 for the purpose to be more fully set forth hereinafter, the details of construction of said by-pass valves 33 and 34, and 33a and 34a being also set forth further on in the description.

The pump units 23 and 24 are of corresponding construction and each includes a barrel 35 mounted upon the driving shafts 26, said barrels 35 being provided with a plurality of cylinders 36 in which pistons 37 are adapted to reciprocate. The pistons 37 in each pump unit are connected by means of piston rods 38 with a swash plate 39 rotatably mounted in a tilting box 40 capable of being adjusted or tilted to different inclinations to thereby vary the stroke of the pistons 37 and consequently the amount of fluid pumped for each rotation of the shafts 26. As the latter are rotated and the pistons 37 are caused to reciprocate, oil or its equivalent will be forced or sucked to the cylinder ports 41 which as the barrel 35 rotates are adapted to register in sequence with suitable ports provided in the valve plates 42 of the pump units 23 and 24 and thence through connections 43 or 43a leading to the by-pass valves 33 or 33a respectively.

Each of the pump units or A-ends 23 and 24 are preferably provided with electrically operated control heads for instance of the type shown in United States patent of Daniel R. Francis #1,785,733 of December 23, 1930, for varying the inclination of the tilting boxes 40 and swash plates 39 thereof; it is of course to be understood that any other type of control suitable for the purpose may be substituted if desired.

In the illustrated example the tilting box 40 of each pump unit 23 and 24 is provided with a lateral projection in the form of a stub axle or pin 44 which is slidably mounted in the central aperture of a spherical bearing 45 rotatably mounted in a correspondingly shaped seat formed in a bearing block 46 located at the lower end of a screwthreaded rod or spindle 47; the bearing block 46 is guided for vertical movement in suitable guideways formed on the inner wall of each pump unit casing. The spindle 47 is in threaded engagement with the internally threaded lower end of a control shaft 48, mounted for rotation, but held against axial movement in any convenient manner within the pump unit casing, as shown, for instance, in Fig. 2; the control shaft 48 projects outwardly beyond the casing of the pump unit and terminates in an outer reduced end 49 of circular cross section, and fitted into a correspondingly shaped socket 50 of a head or coupling member 51 and fixed against relative rotation by means of a conventional key and keyway as shown in Fig. 3. The coupling member 51 at its outer or upper end is provided with an integral stud 52 of cylindrical form projecting axially outward from said head 51 as illustrated in Fig. 3.

The head 51 is rotatably mounted in a bushing 53 suitably secured in a bearing 54 forming part of a main gear case 55 which is supported in any convenient manner upon the casing of the pump unit and may be provided with a suitable cover to render its interior easily accessible at will. Within the gear case 55 is located a worm gear 56 or its equivalent, which is loosely mounted upon the relatively reduced portion 57 of the head 51 and meshes with a worm pinion 58 fixed upon a gear shaft 59 suitably journalled in the gear case 55. The gear shaft 59 projects outwardly beyond the gear case 55 in a direction transverse to the axis of the control shaft 48, so as to terminate within an auxiliary gear case 60 secured to the gear case 55 in any conventional manner, as by means of screw bolts 61. The auxiliary case 60 may also be provided with a removable cover to facilitate access to its interior.

Within the auxiliary gear case 60 the gear shaft 59 carries a worm gear 62 or its equivalent suitably mounted to rotate with said shaft and meshing with a worm pinion 63 or equivalent gear secured upon a driven shaft 64. The latter is suitably journalled in the auxiliary gear case 60 and projects outwardly beyond the same, as illustrated in Fig. 2 and has its external portion connected in any suitable manner with a source of power; in the illustrated example, a sprocket wheel and sprocket chain drive 65 accordingly connects the shaft 64 with the shaft 66 of an electric motor 67. The latter is of the reversible type and may be located in any convenient manner, but preferably is fixed on the casing of the pump unit, as shown in Fig. 2.

The motor 67 and its associated gearing, together with the head 51 constitutes the means whereby the control mechanism of the pump unit may be operated, under remote control and it is to be understood that this illustrated means may be replaced with other and equivalent means, if this should be desired. The arrangement may further include a hand wheel 68 slidably mounted upon the stud 52 and keyed thereon by means of a key 69 for the purpose of manually actuating the control mechanism independently of the aforesaid automatic means whenever this may become necessary or desirable.

The motor units or B-ends 27 and 28 are preferably also all of corresponding construction, and in the illustrated example, are capable of limited control movement whereby the speed of said motor units may be varied, as will appear more fully hereinafter; a description of the construction of one of said motor units will accordingly suffice for all of said units. The motor units correspond in their internal construction to the construction of the pump units and include corresponding barrels and cylinders in which pistons are reciprocable in the manner illustrated with respect to a pump unit in Fig. 2 of the drawings. As the barrels of these motor units are rotated and the pistons thereof are caused to reciprocate, oil or its equivalent will pass through the cylinder ports of said barrels, which, as in the case of the pump units, are adapted to register in sequence with suitable ports provided in the valve plates 42a of said motor units. The aforesaid ports of the valve plates communicate with the by-pass valves 34 and 34a respectively, by means of connections 43b and 43c respectively. The motor units also include tilting boxes 40a mounted in the same way as the tilting boxes 40 but being capable of only a restricted tilt; that is, instead of being movable through the full adjustment of, for instance, 20° from zero to full stroke position, as is customary with the conventional type of pump units as illustrated, the tilting range of the tilting boxes 40a will be restricted to two or three degrees say, for example, from an inclination of 20° to one of fifteen or sixteen degrees. Any suitable means may be provided for effecting the independent adjustment of the tilting boxes 40a of the motor units to individually vary the speed thereof. As shown in Fig. 4, each tilting box may be provided with a stub axle or pin 44a slidably mounted in the central aperture of a spherical bearing block 46a located at the lower end of a screwthreaded rod or spindle 47a; the bearing block 46a is also guided for vertical movement in suitable guideways formed on the inner wall of each motor unit casing. The spindle 47a is in threaded engagement with the internally threaded lower end of a control shaft 48a, which extends upwardly through suitable bearings and at its upper end carries a worm gear 70 preferably located within a casing 71 suitably supported upon the casing of the motor unit, as shown in Fig. 4. The worm gear 70 meshes with a worm pinion 72 carried by a shaft 73 journalled in the casing 71 and projecting exteriorly thereof, as shown in Fig. 5; to facilitate the operation of the control means, a hand wheel 74 is mounted upon the projecting end of the shaft 73.

Under certain conditions, it may become necessary or desirable to stop the operation of one or more sections of the machine, of which the transmission forms a part, or to stop one or more elements of said sections, without affecting the operation of the remaining sections of said machine or elements thereof. For this purpose, the previously mentioned by-pass valves 33 and 34, and 33a and 34a are provided in the pipe lines 29 and 30. As these by-pass valves may all be of the same general construction, an explanation of one will answer for all of them. The by-pass valves referred to, in the illustrated example, comprises casings 75 having passages 76 extending therethrough, as shown in Fig. 6 and provided with flanges 77 whereby said casings 75 are connected with the pipes 29 or 30, as illustrated in Fig. 1. At intermediate points, the casings are provided with valve chambers 78 with which one of the connections 43, 43a, 43b and 43c communicate in each by-pass valve; the other connections 43, 43a, 43b and 43c extend between the respective units 23, 24, 27 and 28 and the casings 75 at points outside of the valve chambers 78 thereof, so that in one position of the by-pass valves, the oil or its equivalent will pass from the pump units 23 and 24 through all of the motor units 27 and 28 of the two illustrated groups, while in another position said by-pass valves will isolate either an entire section of the machine or one or more elements of such section and render the same inoperative for the time being. Each by-pass valve includes a valve plug 79 rotatably mounted in the co-operating chamber 78 and having a passage 80 extending diametrically through said plug and a communicating passage 81 extending from said passage 80 in a transverse direction to the periphery of the plug 79, as illustrated best in Figs. 8 and 9. The by-pass valves each include a special control comprising a stem 82 forming an integral upward extension of each plug 79, to the upper end of which a handle 83 is secured. The control for the by-pass valves in each instance further includes means whereby a quick opening of the by-pass valves is possible and a slow closing movement thereof is compulsory, the open position of the valve being the one shown in Fig. 8 in which the oil or its equivalent simply passes directly through the passage 80 of the valve plug 79 and through the passage 76 of the casing 75 without having any effect on the motor unit associated with the particular by-pass valve which has been adjusted to effect the aforesaid by-passing of the oil or its equivalent.

In the illustrated example the means referred to comprises auxiliary casings 84 each suitably supported upon the casing 75 of each by-pass valve 33, 34, 33a and 34a, and provided interiorly with oil chambers 85 and 85a, the first of which may be suitably connected, as by means of a pipe 86 with the system of which the device forms a part, to insure a sufficient supply of oil in said chambers 85 and 85a at all times; as shown in Figs. 6 and 7 a check valve 86a may be included in the pipe 86 to prevent a return flow therein. A plunger 87 is slidably mounted in the casing 84 and is connected with pistons 88 and 88a slidably movable in the oil chambers 85 and 85a respectively as shown in Fig. 7; the plunger 87 is further provided with a rack 89 which meshes with a pinion 90 mounted upon the stem 82 and rotatably located in a circular extension 91 of the casing 84, through which said stem 82 extends, as shown in Fig. 7. In addition to the parts so far described the aforesaid means is provided with a channel 92 communicating at its opposite ends with the oil chambers 85 and 85a respectively, and including a valve chamber 93 having an interior valve seat 94, and normally closed at its outer end by means of an apertured plug 95 or the like as shown in Fig. 10. A check valve 96 co-operates with the seat 94 to control the communication between the channel 92 and the valve chamber 93, and is carried by a valve stem 97 slidably mounted in the plug 95 and projecting outwardly beyond the same as shown in Fig. 10; a spring 98 having its one end in engagement with the plug 95 and its other abutting said valve 96 serves to maintain the latter on said seat 94 and to return it thereto. As illustrated in Fig. 10 an axial passage 99 extends through the check valve 96 and its stem 97 and is provided with an interior seat 100, said passage 99 communicating with radial ports 101 formed in the stem 97 and opening into the valve chamber 93. A needle valve 102 is mounted in the passage 99 so as to be adjustable lengthwise thereof with respect to the seat 100, with which said needle valve 102 co-operates to control the passage of the oil or its equivalent in the manner to be more fully set forth hereinafter. In order to effect the aforesaid adjustment, the needle valve 102 includes a screwthreaded section 103 threaded into the outer end portion of the passage 99 and extending outwardly beyond the same as shown in Fig. 10; to facilitate the adjustment of said needle valve 102 the outer end of the section 103 may be slotted for the accommodation of a screwdriver or the like. In the preferred arrangement a protecting cap 104 is removably mounted on the plug 95 so as to completely cover the outer end of the section 103 and thereby prevent unintentional interference with the adjustment of said needle valve 102.

During the operative periods of all parts of the machine in which the transmission and its associated elements are incorporated, the by-pass valves 33 and 33a will occupy the positions illustrated in Figs. 6 and 7, in which the valve plugs 79 are set, as indicated in Fig. 9. In practice, the motor 25 being in operation, the driving shafts 26 of the pump units 23 and 24 will be rotated to correspondingly rotate the barrels 35 and swash plates 39, the latter rotating in the tilting boxes 40 in the well known manner. As long as the tilting boxes 40 and swash plates 39 occupy the neutral position illustrated in Fig.

2, the pistons 37 will remain stationary in the cylinder 36 and no oil or its equivalent will be pumped through the pipes 29 and 30, with the result that the motor units 27 and 28 of each group shown in Fig. 1 will remain stationary. Under ordinary conditions which include remote control, the electrically operated control will be operated by the motors 67 to adjust the tilting boxes 40 and the swash plates 39 of the pump units 23 and 24, in accordance with a predetermined plan of operation to rotate the control shafts 48 and to thereby raise or lower the co-operating spindles 47, whereby the bearing blocks 46 will be correspondingly raised or lowered in the aforesaid guideways.

It will be understood that the operation of the motor 67 for controlling the automatic adjustment of the tilting boxes 40 of the pump units 23 and 24 is controlled in any customary manner by means of suitable switches or push buttons, and further, that limit switches of any conventional form and construction may be provided to avoid the possibility that the electric motor 67 may overrun the control in either direction in case said switches or push buttons are unintentionally left closed or the system should become short-circuited.

As the aforesaid operation of the bearing blocks 46 takes place, the tilting boxes 40 and swash plates 39 will be adjusted to different positions and to varying degrees of inclination to thereby vary the stroke of the pump units 23 and 24 and correspondingly vary the speed of operation of the co-operating motor units 27 and 28 in each group. With the by-pass valve plug 79 in the position shown in Fig. 9, all of the motor units 27 and 28 in each group are connected in series so that all of the oil or its equivalent pumped by the pump units 23 and 24 will pass through the motor units 27 and 28 of each group to operate said motor units 27 and 28 at a corresponding speed if all of the swash plates thereof occupy the same angular positions; this will accordingly bring about an operation of the various units comprising each section of the machine, such as illustrated. Under such conditions, variation in the stroke of the pump units 23 and 24 will produce a corresponding variation in the speed of all of the motor units 27 and 28 in each group. If for any reason it should become necessary or desirable to produce an independent different speed in any one or more of the motor units 27 or 28 of each group, the tilting boxes 40a thereof may be adjusted to secure the desired result, by means of the proper hand wheel 74 and its associated mechanism. If the stroke of the pistons in any one or more of the motor units 27 or 28 is thus varied, its speed will be changed accordingly; that is, if the stroke is reduced, the speed of the affected motor unit will be increased, and if the stroke is increased, the speed of such unit will be reduced. With this arrangement, it is possible to make slight adjustments of speed between the different motor units or B-end which is necessary and desirable in the operation of various machines for which the transmission is specially adapted; such variation may be desirable, for instance, to provide for shrinkage in the web of material which is passing through the machine, and to also provide adjustment to take care of variations in the size of the various rolls of the driven machine, if the latter include these elements. For example, in a paper machine such as illustrated, many of the rolls are made of hard rubber and become marked and damaged in service, so that it becomes necessary to re-grind the same to provide the desired smooth surface. This re-grinding process obviously reduces the diameter of such rolls, so that the rotational speed must be varied to maintain a constant peripheral speed.

Under certain conditions, it may also become necessary to stop the operation of one or more sections of the machine, or one or more units of such sections, without affecting the operation of the other sections or the other units of a given section, as for example, in connection with the manufacture of certain papers it may under certain conditions become desirable to stop the operation of the suction roll 11 and the second press roll 12. When this stoppage of these elements of the machine or any other individual elements thereof is desired, the handle 83 of the associated by-pass valve 79 is moved from its normal position in the direction indicated by the arrow $a$ in Fig. 7, so that the valve plug 79 will be correspondingly moved from the position shown in Fig. 9 to that indicated in Fig. 8. As the handle 83 is operated in the direction of the aforesaid arrow $a$, the pinion 90 by acting on the rack 89 will force the plunger 87, and with it the pistons 88 and 88a, toward the left in Fig. 7; during this movement of the piston 88, the check valve 86a will prevent the oil from being forced back through the pipe 86. The oil or its equivalent accordingly will be forced, by the action of the piston 88, from the chamber 85 and into the channel 92. The pressure thus created by the oil or its equivalent in said channel 92 acts upon the valve 96 and forces the same away from the seat 94 against the tension of the spring 98 which preferably is rather light. As the valve 96 is thus opened the oil or its equivalent passes into the valve chamber 93 and through the continuing portion of the channel 92 into the chamber 85a. The spring 98 being relatively light the resistance to the passage of the oil or its equivalent through the channel 92 from the chamber 85 to the chamber 85a will be comparatively small, and the plunger 87 and pistons 88 and 88a accordingly are easily shifted to the left in Fig. 7 as above set forth. The particular by-pass valve 79 may thus be quickly shifted from the position shown in Fig. 9 to the one illustrated in Fig. 8. With the valve plug 79 in the position shown in Fig. 8, the oil or its equivalent which is being pumped by the pump unit 23 or 24, as the case may be, will pass directly through the passage 80 of the valve plug 79 and through the passage 76 of the casing 75, or, in other words, will be by-passed without any effect upon the motor unit associated with the by-pass valve which has been adjusted to effect such by-pass. In returning the by-pass valve 79 from the position shown in Fig. 8 to that illustrated in Fig. 9, in which the associated motor unit will again be operated, it is desirable, for the reasons more fully set forth hereinafter, to oppose this adjustment of said by-pass valve 79 so that its movement from the open position shown in Fig. 8 to the closed position illustrated in Fig. 9 will be relatively slow. This is accomplished in the following manner. In restoring the valve 79 from the position shown in Fig. 8 to that of Fig. 9, the hand lever 83 is operated in the direction indicated by the arrow $b$ in Fig. 7 to thereby correspondingly actuate the pinion 90 and rack 89 to cause the plunger 87 and with it the pistons 88 and 88a to move toward the right in Fig. 7. As this occurs the piston 88a will exert a pressure tending to force the oil or its equivalent from the chamber 85a, the oil or its equivalent, under such conditions, passing out through the right hand end of the channel 92 into the valve chamber 93 and from thence through the ports 101 and axial passage 99 into the continuing portions of the channel 92 and through the same to the chamber 85. Because of the relatively restricted dimensions of the ports 101 and axial passage 99 and due to the setting of the needle valve 102 with respect to the seat 100, a considerable resistance will be developed to the flow of the oil or its equivalent in this direction. It is accordingly difficult to move the plunger 87 and pistons 88 and 88a to the right in Fig. 7, with the result that the shifting of the by-pass valve 79 from the open position of Fig. 8 to the closed position of Fig. 9 is necessarily slowed up to the desired extent; the degree of retardation may be varied by adjusting the needle valve 102 relatively to the seat 100 as will be apparent.

With the indicated arrangement, the by-pass valves may thus be quickly opened by operating the handle 83 to by-pass the oil or its equivalent relatively to any given motor unit, which, in addition to its other advantages, is desirable and even necessary in the case of an emergency, such, for example, as when a man becomes caught in a section of the machine or an element of such section. Because of the plunger 87, pistons 88 and 88a and their associated elements, the closing of the by-pass valve will be relatively slow, which is an important feature, in that it prevents a too quick starting of a section or an element of such section with the consequent shock to all of the driving and driven mechanisms. If it is desired to simultaneously arrest the operation of all of the motor units of a given section of the machine, such as the units 27 of the illustrated example in Fig. 1, it is simply necessary to operate the by-pass valve 33 in the indicated manner to open the same in which case the oil or its equivalent which is being pumped by the pump unit 23 is simply by-passed and equalizes the pressure on both sides of the motor units 27 which consequently develop no tendency to turn.

The novel arrangement provides an efficient means whereby the different sections of a given machine or the individual elements of such sections may be effectively operated in accordance with the requirements of each particular instance, or any developed peculiarities in the material which is being produced by said machine. In other words, the individual sections or the elements comprising such sections may be controlled at will to provide for relative and independent operation thereof, as well as independent stoppage and control of the individual elements constituting the machine. The by-pass valves illustrated and described herein, in addition to their functions in by-passing the oil or its equivalent when it is desired to arrest the operation of one or more sections of the machine, or one or more elements of such sections, operate also as clutches to provide for the starting and stopping of a section. The control of the motor or B-ends also provides for close and accurate adjustment of draw between sections of the machine and between individual parts of such sections. As previously stated, the by-pass valves provided at the pump sections 23—24, in addition to their other functions, provide an efficient means for starting the elements of a given section of the machine, or the sections of such machine absolutely in unison. For instance, under certain conditions, a pick-up felt might be run over two or more of the sections of a paper machine and would require careful synchronization by means of a speed indicator before the felt is put in place. With the illustrated arrangement, after all of the sections or all of the elements of a section have been brought to absolutely the same speed, the by-pass valve at the co-operating pump unit may be opened to stop the said section or the elements thereof while the felt is placed in position therein. With the felt in place, the entire group may then be simultaneously and gradually started at the same speed, or the predetermined speed, by closing this single by-pass valve.

While the drawings show the invention incorporated in a paper machine, it will be readily understood that the novel arrangement may be applied with equal efficiency to any machine comprising a plurality of sections, or any machine in which a continuous web or strand of material is passed continuously through all of the sections and where synchronism of speed is necessary, but at the same time it is desired to provide for varying speeds between sections to compensate for shrinkage or stretching of the material or for other developed changes therein. In the illustrated example, the paper machine is shown as consisting of two sections; it will be understood that the mechanism will operate with equal efficiency in an entire machine comprising one section or a machine consisting of more than two main sections. For example, with the type of transmission shown in the drawings and described herein, it is possible to provide for a very wide difference in speed between two main sections, as for example, in a paper machine making crepe papers. With such machines, it is necessary, in order to produce the product most efficiently, to operate the driers very much slower than the preceding sections in order to permit the necessary weight of crepe to be made between the driers and the last preceding section of the machine. Obviously, the transmission will operate with equal efficiency in connection with machines comprising fewer sections than those included in the illustrated example.

Various changes in the specific forms shown and described may be made within the scope of the claims without departing from the spirit of the invention.

We claim:—

1. A variable speed gear transmission comprising a driving unit, a plurality of driven units connected with each other and with said driving unit in series, means whereby the operation of all of said driven units may be simultaneously adjusted to vary the operation thereof without altering the operative relation of said driven units to each other, and whereby said driven units may be simultaneously arrested without stoppage of the driving unit, and means whereby the operation of individual driven units may be selectively adjusted to independently vary the operative relation thereof with respect to the other driven units, and selectively arrested independently of the other driven units and of the driving unit.

2. A variable speed gear transmission comprising a driving unit, a plurality of driven units connected with each other and with said driving unit in series, means whereby the operation of all of said driven units may be simultaneously adjusted to vary the operation thereof without altering the operative relation of said driven units to each other, manually controlled means whereby the driven units may be instantaneously arrested simultaneously without stoppage of the driving unit and without altering the operative relation of said driving and driven units, means whereby the operation of individual driven units may be selectively adjusted to independently vary the operative relation thereof with respect to the other driven units, and manually controlled means whereby individual driven units may be instantaneously arrested independently of the other driven units.

3. A variable speed gear transmission comprising a power driven fluid pressure pump, a plurality of fluid pressure motors connected with each other and with said pump in series, means whereby the operation of all of said motors may be simultaneously adjusted to vary the operation thereof without altering the operative relation of said motors to each other, a manually controlled by-pass valve for instantaneously arresting the operation of all of said motors simultaneously without altering the operative relation thereof, means whereby the operation of individual motors may be selectively adjusted to independently vary the operative relation thereof with respect to the other motors, and independent manually controlled by-pass valves whereby the operation of individual motors may be instantaneously arrested without interference with the operation of the other motors and without disturbance of the operative relation of all of said motors.

4. A variable speed transmission comprising a power driven fluid pressure pump, a plurality of fluid pressure motors operatively connected with each other and with said pump in series, means for varying the output of said pump to vary the speed of all of said motors simultaneously, said means being adjustable from a zero position to a predetermined maximum position, adjustable means for varying the speed of the motors independently of said pump, said last named means having a range of adjustment from a position corresponding to the aforesaid maximum to a position between said maximum and a point corresponding to the aforesaid zero position, and by-pass valves manually controlled independently of each other for instantaneously arresting the operation of a selected motor independently of the other motors and of said adjusting means.

ARTHUR L. ELLIS.
DANIEL R. FRANCIS.